No. 819,090. PATENTED MAY 1, 1906.
A. M. SMITH & W. C. DEAN.
SCRAPER.
APPLICATION FILED JULY 22, 1905.

Witnesses:
W. L. McMaster
Joe Shill

Inventors,
Archie Monroe Smith
William Calvin Dean

UNITED STATES PATENT OFFICE.

ARCHIE MONROE SMITH AND WILLIAM CALVIN DEAN, OF BALLINGER, TEXAS.

SCRAPER.

No. 819,090.     Specification of Letters Patent.     Patented May 1, 1906.

Application filed July 22, 1905. Serial No. 270,382.

*To all whom it may concern:*

Be it known that we, ARCHIE MONROE SMITH and WILLIAM CALVIN DEAN, citizens of the United States, residing at Ballinger, in the county of Runnels and State of Texas, have invented certain new and useful Improvements in Scrapers, of which the following is a specification.

This invention relates to improvements in that type of scrapers which are commonly known as "fork scrapers," and has for its object to produce a device of this character which, owing to its peculiar construction, has a very wide range of usefulness.

The essential feature of the invention resides in the provision of a skeleton scraper with a removable lining or bottom. This has the advantage of enabling the scraper to be used in soft and sandy soils, as well as the heavier soils.

For a full description of the invention and the merits thereof and also to acquire a knowledge of the details of construction of the means for effecting the result reference is to be had to the following description and accompanying drawings, in which—

Figure 1:
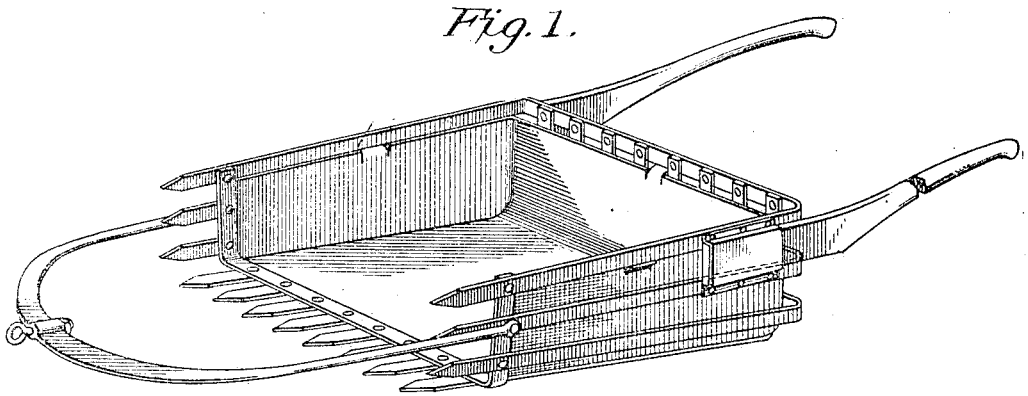
Figure 2:
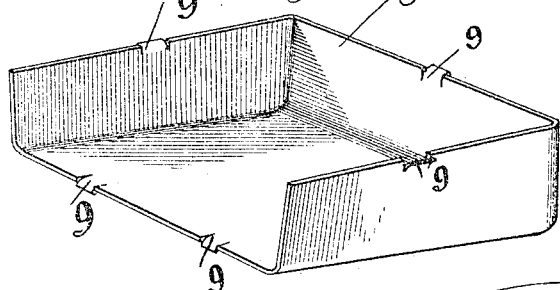
Figure 3:
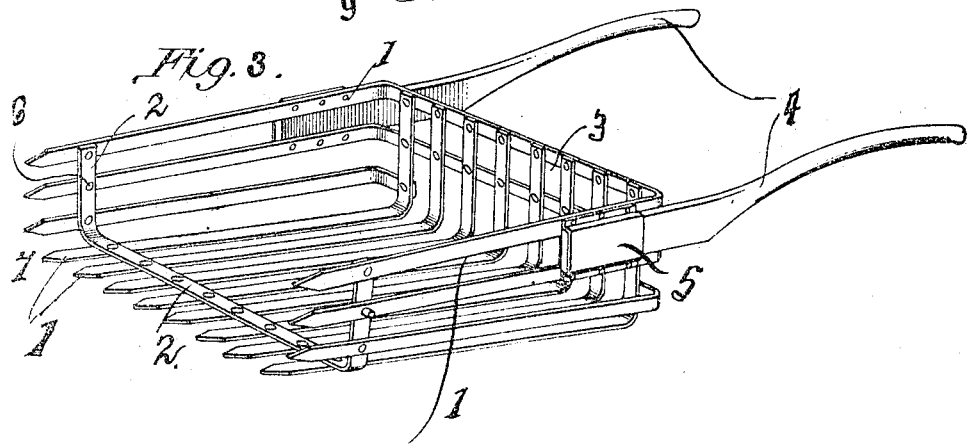

Figure 1 is a perspective view of my improved scraper and shows the removable bottom or lining in position. Fig. 2 is a perspective view of the removable bottom. Fig. 3 is a similar view of the skeleton frame.

Corresponding and like parts are referred to in the following description and indicated in all the views of the drawings by the same reference characters.

The skeleton frame of the scraper comprises the usual bottom, sides, and end, the bottom and sides being composed or a series of longitudinally-disposed teeth or tines connected near the forward end by a transversely-extending U-shaped bar 2, while the end of the scraper is formed by bending the rear ends of the bottom tines upward and connecting them to transverse rods 3, which join opposite and corresponding side tines 1. It will be observed that the rear end of the lowermost side tines 1 are simply bent around and secured to upturned ends of the adjacent bottom tines 1 and are not connected by a cross-bar 3. Handles 4 extend upwardly and rearwardly from the skeleton frame and are secured thereto by inserting their ends into sockets formed by pieces of metal 5, which are secured to the two uppermost side tines 1. The U-shaped yoke 6 has its arms pivotally connected to the forward end of the scraper and is provided with a draft hook or eye 7, which is swiveled therein. This skeleton framework will be found to give most satisfactory results in heavy soils and owing to its elasticity is frequently more efficient than the solid or more rigid type of scraper in general use. However, it could not be used in soft or sandy soils, and for this purpose the removable lining or bottom 8 has been devised. This removable bottom 8 fits within the skeleton framework in the rear of the cross-bar 2 and is formed with a bottom, sides, and ends corresponding to those of the scraper. In order to prevent accidental displacement of the bottom 8, spring-tongues 9 are bent outwardly from its edges and are adapted to engage with the cross-bar 2, the uppermost side tines, and the top cross-bar 3 on the end of the scraper. It will thus be understood that the scraper can be used either with or without the lining 8, according to the character of the work to be done and of the soil to be excavated, and is therefore capable of giving the most efficient service under all conditions of use.

Having described the invention, what is claimed as new is—

1. The combination of a scraper and a removable bottom or lining therefor.

2. The combination of a scraper, a removable bottom or lining therefor and means for holding the removable bottom or lining in position.

3. The combination of a scraper, a removable bottom or lining therefor and tongues projecting from the removable bottom or lining and engaging with the scraper to hold the lining in position.

4. The combination of a scraper the sides and bottom of which are formed of longitudinally-disposed teeth or tines connected by a transverse bar, a removable bottom or lining comprising a bottom, sides, and end corresponding to those of the scraper and fitting therein in the rear of the aforementioned cross-bar, and tongues projecting from the edges of the removable bottom and engaging with the cross-bar, the uppermost side tines and the transverse bar connecting the rear ends of the uppermost side tines.

ARCHIE MONROE SMITH.
WILLIAM CALVIN DEAN.

Witnesses:
W. L. TOUNER,
JOE SPILL.